United States Patent [19]

Dong

[11] Patent Number: 5,039,933
[45] Date of Patent: Aug. 13, 1991

[54] TWO-SIDED INDUCTION GENERATOR WITH BOTH STATOR AND ROTOR WINDINGS CONNECTED IN PARALLEL

[75] Inventor: Jilan Dong, Birmingham, Ala.
[73] Assignee: John Dong, Birmingham, Ala.
[21] Appl. No.: 580,163
[22] Filed: Sep. 10, 1990
[51] Int. Cl.[5] ............................ H02P 9/46; H02P 9/38
[52] U.S. Cl. ...................................... 322/47; 322/95; 322/96; 322/98
[58] Field of Search ..................... 322/47, 95, 96, 98

[56] References Cited

U.S. PATENT DOCUMENTS

| | | | |
|---|---|---|---|
| 3,737,760 | 6/1973 | Kiwaki et al. | 322/28 |
| 3,768,002 | 10/1973 | Drexler et al. | 322/25 |
| 4,371,828 | 2/1983 | Tornatore et al. | 322/32 |
| 4,409,539 | 10/1983 | Nordbrock et al. | 322/28 |

Primary Examiner—William H. Beha, Jr.
Assistant Examiner—Dennis R. Haszko
Attorney, Agent, or Firm—Jennings, Carter, Thompson & Veal

[57] ABSTRACT

An induction generator is disclosed wherein both the stator and rotor windings are utilized to generate power with the three phase winding of the stator and rotor each connected in parallel with a delta connected capacitive network connected therebetween. The electrical output may thus be increased by a factor of four over a conventional generator of the same size.

3 Claims, 5 Drawing Sheets

TWO-SIDED INDUCTION GENERATOR WITH BOTH STATOR AND ROTOR WINDINGS CONNECTED IN PARALLEL

FIELD OF THE INVENTION

The present invention relates generally to the field of electrical generators and more particularly to the field of asynchronous electrical generators wherein the stator and rotor are both employed to generate electrical power in a three phase system.

BACKGROUND OF THE INVENTION

Conventional electrical generators have used either the rotor or stator as the output generating means for providing electrical power, however, it is not known that both the rotor and stator have been utilized to generate a usable output. It has been known heretofore to connect more than one AC generator in parallel to yield a desired output with appropriate phase relationships, however it has not been known to connect the rotor and stator in parallel to provide a common output.

SUMMARY OF THE INVENTION

It is the principal object of this invention to provide an improved generator. It may be considered as a special use of a wound rotor asynchronous machine in which electrical power is generated in both stator and rotor windings simultaneously and connected both windings in parallel to supply a common load. The main speciality of this machine is its extra electrical power generating ability. When a corresponding sufficient mechanical power input is available, the generator provides a rated electrical output power more than four times of the rated mechanical output power of the same machine when it is used as an induction motor.

The achievement of these and other objects is predicated on the recognition of the relationship between the rotating magnetic field, the stator windings, and the rotor windings. It will be observed that in the present invention the rotating magnetic field of the generator has an angular speed of $\omega$ in a given direction relative to the fixed stator while the rotor has an angular speed of $2\omega_1$ in the same direction as the rotating magnetic field. Consequently, the rate of relative movement between the windings of the stator and the magnetic field is $\omega_1$, in a first angular direction and the relative movement between the windings of the rotor and the magnetic field is $\omega_1$ in the opposite angular direction. With proper connections of the rotor and stator windings as well as modifications of both sides of windings a two-sided induction generator may be designed.

BRIEF DESCRIPTION OF THE DRAWINGS

Apparatus embodying features of my invention are depicted in the accompanying drawings which from a portion of this disclosure and wherein.

DESCRIPTION OF THE PREFERRED EMBODIMENT

Figure 3:
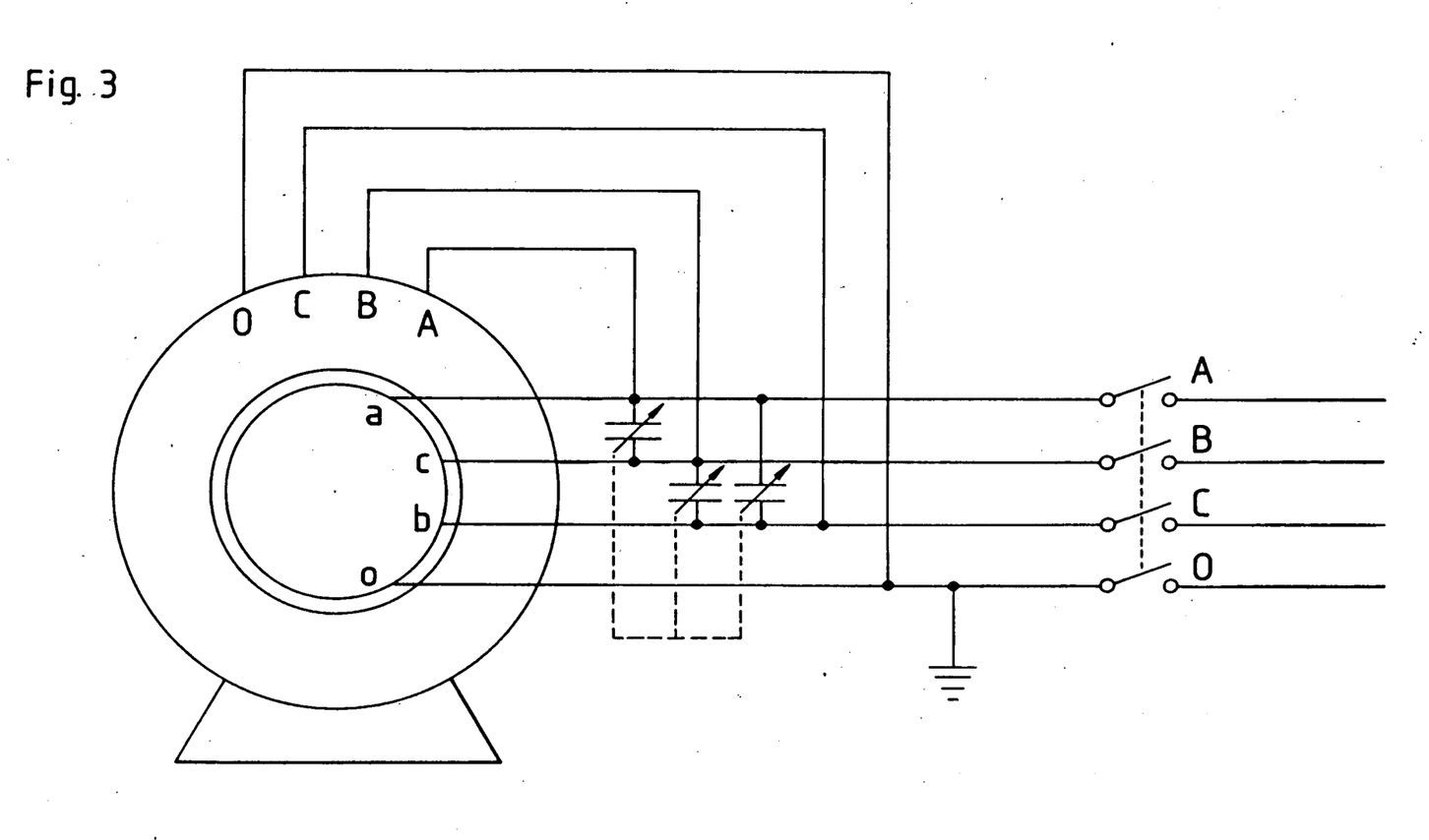
FIG. 3 is a schematic depiction of the connection of the stator and rotor windings of my apparatus to provide a paralleling three phase output.

Referring to the drawings and to the hereinafter recited equations, it will become apparent that a new and improved generator is herein disclosed. In FIG. 3, I have presented a schematic diagram of my generator. It is depicted with a plurality of output lines designated as A, B, C, and O, which indicates the output lines and neutral point from the Y-connected three phase windings of the stator. Also shown are a plurality of output lines designated as a, b, c, & o, which indicate the output lines from the Y-connected rotor three phase windings and the neutral point of the rotor winding. As will be discussed more fully hereinafter output lines A and a are connected in parallel, output lines B and c are connected in parallel, and output lines C and b are connected in parallel through brushes and slip rings on the shaft of the machine (not shown in the figure) and the resulting three phase output lines are connected to a delta connected three phase condenser set. The output line o from neutral point of the rotor windings may be fastened on the shaft and electrically connected to the output line o from stator neutral through bearings and base of the machine to give the common zero line. It is proved that this connection of neutral points fulfills practical use. Note that the rotor windings are not the typical rotor windings but rather are modified. The effective number of turns of the rotor windings are changed to make the voltage ratio, $K_e$ and the current ratio $K_i$ as nearly as possible equal to 1, that is $K_e = K_i = 1$; and both sides to have almost the same rated currents so that they may undertake about equal parts of the full load.

Figure 4:
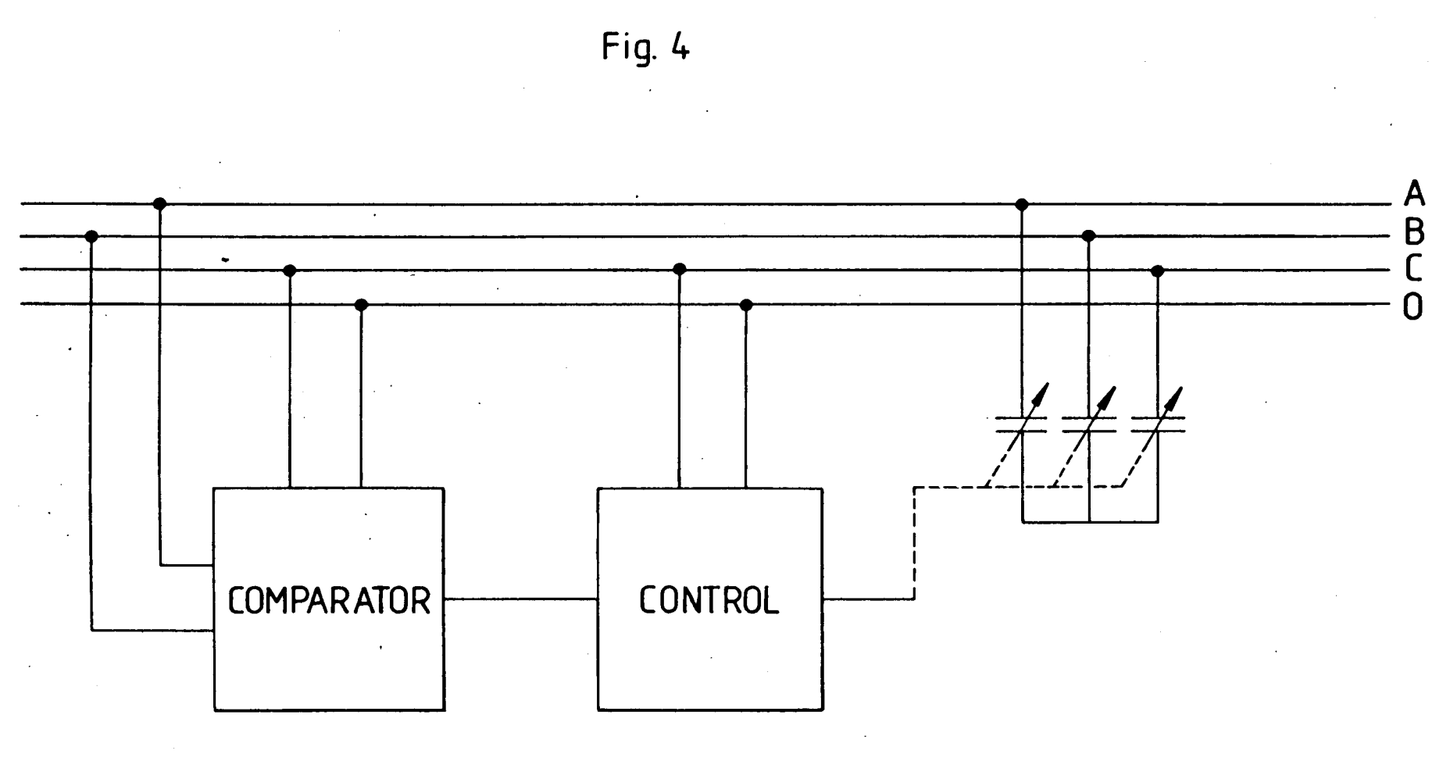
FIG. 4 is a block diagram showing the connection of the generator to a voltage control and feedback system.

The connection of the windings and the outside circuits is shown in FIG. 3 and 4. The exit ends of the Y-connected three phase windings of both sides are connected in parallel to give a common three phase load, but the space phase sequence of the rotor windings and the stator windings must be opposite as stated above and shown in FIG. 3. Then, the rotor of the machine is driven to twice the synchronous speed so that a "Self-excited two-sided induction generator with both stator and rotor windings connected in parallel" is established.

Analysis of the generator is simplified by the calculation with the equivalent whole inductance of the stator winding $L_1$, that of the rotor winding $L_2$ and the equivalent mutual inductance M of a stator winding and a rotor winding when their axes are coincident. The inductances and resistances may be obtained either by theoretical calculation or by experiments. As these parameters are confirmed, we may go to theoretical analysis.

Figure 1:
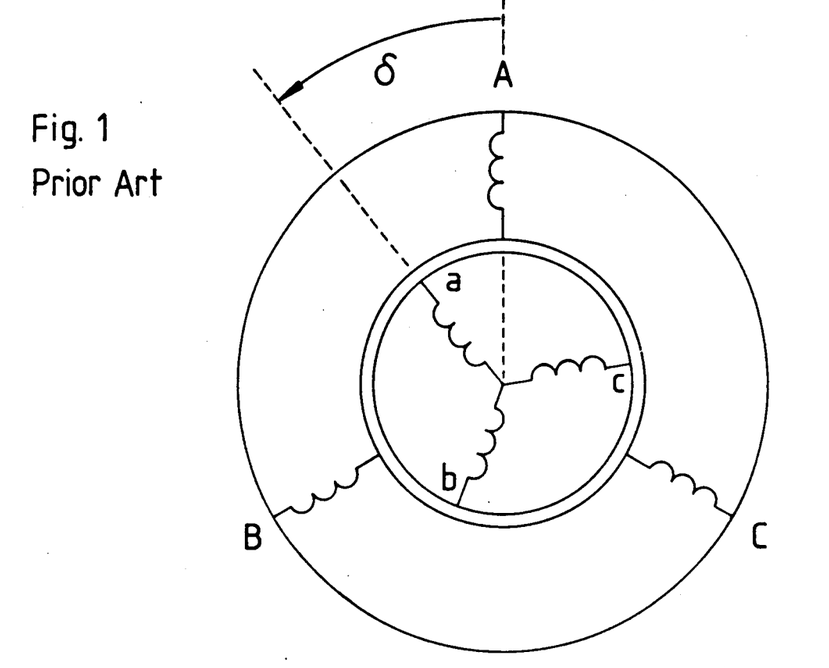
FIG. 1 is a schematic depiction of space phase relationship of the rotor and stator windings at time t=0.

In the generator illustrated in FIG. 1 assume that three-phase current of positive angular frequency $\omega_1$ is flowing in the stator producing thereby a rotating magnetomotive force (MMF) in the counterclockwise direction with an angular speed $\omega_1$, rad/sec.

If the rotor is driven at a speed of $\omega = 2\omega_1$, rad/sec in the counterclockwise direction with a three phase current therein of negative sequence with an angular frequency of $\omega_2 = -\omega_1$, then a rotor MMF is produced with an angular speed of $\omega_2 = -\omega_1$ rad/sec relative to the rotor. That is to say the rotor MMF moves clockwise to the rotor at a speed of $\omega_1$ rad/sec. Thus the rotating speed of the rotor MMF in space is rotor speed (2 ω₁) plus rotor MMF speed ($-\omega_1$)=net speed of rotor MMF=$\omega_1$ in a counterclockwise direction. Under these conditions the rotating MMF of the rotor and stator currents have the same direction and speed in space. Thus a resultant MMF can be produced to yield a principal magnetic field rotating in the counterclockwise direction, which induces positive sequence three-phase electromotive force, thus positive sequence three-phase currents in the stator. Since the rotor is moving at an angular speed 2₁ in a counterclockwise direction the relative motion between the rotor and the principal magnetic field induces negative sequence three-phase electromotive forces, hence negative sequence three-phase currents in the rotor. Consequently, the conditions for generating electrical power with the stator and rotor winding connected in parallel are satisfied.

Note, that, for the apparatus to be operable to obtain the same order of variations of three phase currents in both stator and rotor, we must connect the positive sequence windings ABC of the stator and the negative sequence windings acb of the rotor in parallel, as in FIG. 3.

In the FIG. 3, let the terminal voltage and the current in phase A of the stator be:

$$u_1 = U_m \sin\omega_1 t, \quad (1)$$

$$i_1 = I_m \sin(\omega_1 t + \phi_1) \quad (2)$$

respectively, while the terminal voltage and the current in phase a of the rotor is:

$$u_2 = U_{m2} \sin(\omega_2 t - \alpha), \quad (3)$$

$$i_2 = I_{m2} \sin(\omega_2 t - \alpha + \phi_2) \quad (4)$$

respectively, where $\phi_1$, $\phi_2$ and $\alpha$ are constants. If the axis of winding a of the rotor leads that of winding A of the stator, an angle $\delta$, in the direction of rotation at the time t=0, then at any time t, the axis of winding a will lead that of winding A to an angle $\delta_t = \delta + t$. On the other hand, the slip of the machine is s=($\omega_1 - 107$)/$\omega_1 = -1$.

If the axes of rotor winding a and the stator winding A are always in coincidence, then at any time t the mutual magnetic flux linkage produced by the current i₂ in the winding a to the winding A is Mi₂=MI$_{m2}$sin($\omega_2 t - \alpha + \phi_2$). But in fact the winding a leads the winding A by an angle $\delta_t$, so that the mutual magnetic flux linkage produced by the current to the winding A corresponds to that wherein a time phase angle $\delta_t$ is added to the current of the winding a. For this reason, at the time t, the mutual flux linkage produced by the current of the winding a to the winding A is $$\begin{aligned}\psi_{12} &= MI_{m2}\sin(\omega_2 t - \alpha + \phi_2 + \delta_t) \\ &= MI_{m2}\sin(\omega_2 t - \alpha + \phi + \delta + t) \\ &= MI_{m2}\sin(\omega_1 t - \alpha + \phi_2 + \delta)\end{aligned} \quad (5)$$

Similarly, at the time t, the mutual flux linkage produced by the current i of winding A to the winding a is corresponding to that wherein a time phase angle $\delta_t$ is subtracted from the current i₁, that is $$\begin{aligned}\psi_{21} &= MI_{m1}\sin(\omega_1 t + \phi_1 - \delta_t) \\ &= MI_{m1}\sin(\omega_1 t + \phi_1 - \delta - \omega t) \\ &= MI_{m1}\sin(\omega_2 t + \phi_1 - \delta)\end{aligned} \quad (6)$$

Let the resistance of the stator winding and that of the rotor winding be R₁, and R₂, then the voltage balance equations are $$u_1 = -\frac{d\psi_{12}}{dt} - R_1 i_1 - \frac{d}{dt}(L_1 i_1), \quad (7)$$

$$u_2 = -\frac{d\psi_{21}}{dt} - R_2 i_2 - \frac{d}{dt}(L_2 i_2). \quad (8)$$

Substituting the quantities from the expressions (1) to (6) into equations (7) and (8), we get $$U \sin\omega_1 t = -\omega_1 MI_{m2}\sin(\omega_1 t - \alpha + \phi_2 + \delta + \pi/2) -$$
$$R_1 I_{m1}\sin(\omega_1 t + \phi_1) - \omega_1 L_1 I_{m1}\sin(\omega_1 t + \phi_1 + \pi/2),$$

$$U_{m2}\sin(\omega_2 t - \alpha) = -\omega_2 MI_{m1}\sin(\omega_2 t + \phi_1 - \delta + \pi/2) -$$
$$R_2 I_{m2}\sin(\omega_2 t - \alpha + \phi_2) - \omega_2 L_2 I_{m2}\sin(\omega_2 t - \alpha + \phi_2 + \pi/2).$$

multiplying both sides of the upper equations by $-1$, and expressing all terms by complex quantities, we have $$-\dot{U}_1 = (R_1 + j\omega_1 L_1)\dot{I}_1 + j\omega_1 M \dot{I}_2 \underline{/\delta}, \quad (9)$$

$$-\dot{U}_2 = j\omega_1 M \dot{I}_1 \underline{/-\delta} + (R_2 + j\omega_2 L_2)\dot{I}_2, \quad (10)$$

Where $$\dot{U}_1 = U, \quad \dot{I}_1 = I_1 \underline{/\phi_1} \quad (11)$$
$$\dot{U}_2 = U_2 \underline{/-\alpha}, \quad \dot{I}_2 = I_2 \underline{/-\alpha + \phi_2}.$$

In an induction machine, the frequency of the currents in the rotor is f₂=sf which is different from that in the stator. In order to solve the voltage equations of two sides simultaneously, we must find the equivalent stationary rotor, in which the current frequency is the same as that of the stator and produces the same effects to the magnetic field as the true rotor. Again, the number of phase and the effective number of turns must be in turn equal to those of the stator. Then the voltage and the current in the equivalent stationary rotor are called conversion values of voltage and current and denoted by U' and I' respectively. The conversion values of rotor resistance and inductance is equal to the true values multiplied by the ratio coefficient $k = k_e k_i$, where $k_e$ is the voltage ratio and $k_i$ is the current ratio.

Figure 2:
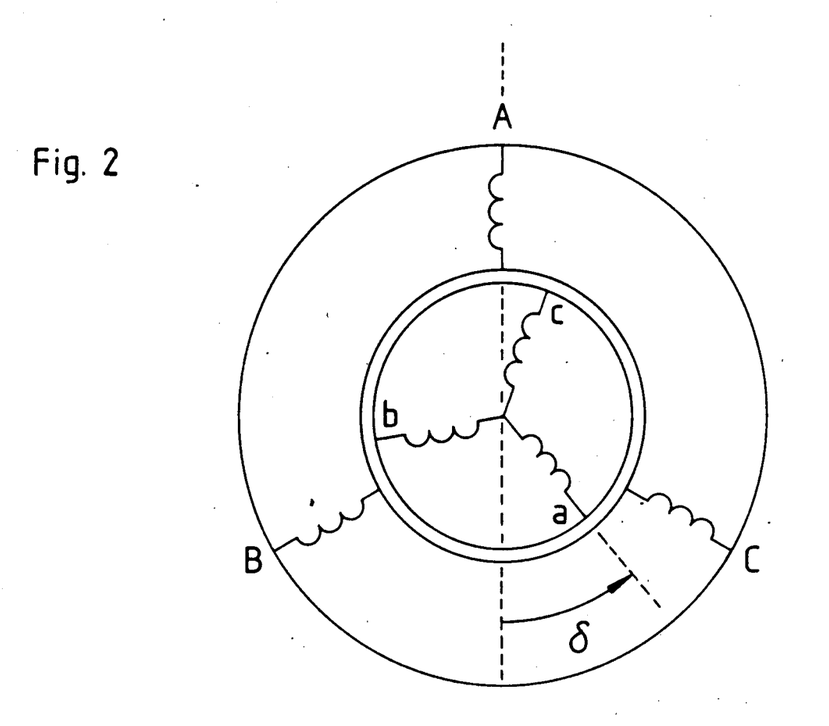
FIG. 2 is a schematic depiction of the same relationship as the rotor is changed to an imaginary equivalent stationary rotor.

In the case of the two-sided induction generator, $k_e = k_1 = 1$ and $\omega = 2\omega_1$, let us imagine that at t=0, the rotor is reoriented, so that the relative positions of windings are shown in FIG. 2 and fixed. In this manner the rotor is the equivalent stationary rotor, the rotating magnetic field is running counterclockwise and the axis of the winding a leads that of the winding A for an angle $\delta' = ' + \pi$. Again, since $\omega_2 = s\omega_1 = -\omega_1$, equations (9) and (10) are changed to be $$-\dot{U}_1 = (R_1 + j\omega_1 L_1)\dot{I}_1 + j\omega_1 M \dot{I}_2' \underline{/\delta'} \quad (12)$$

$$-\dot{U}_2' = -j\omega_1 M \dot{I}_1 \underline{/-\delta'} + (R_2 - j\omega_1 L_2)\dot{I}_2'. \quad (13)$$

Substituting $\delta + \pi$ for $\delta'$, we get:

$$-\dot{U}_1 = (R_1 + j\omega L_1)\dot{I}_1 - j\omega_1 M \dot{I}_2' \angle \delta, \qquad (14)$$

$$-\dot{U}_2' = j\omega_1 M \dot{I}_1 \angle -\delta + (R_2 - j\omega_1 L_2)\dot{I}_2'. \qquad (15)$$

The self inductance of the stator winding, $L_1$, consists of two parts, one produced by the principal magnetic flux, $L_{m1}$, and the other produced by the stator leakage flux, $L_{s1}$, that is $$L_1 = L_{m1} + L_{s1}; \qquad (16)$$

Similarly, the rotor self inductance $L_2$ also consists of two parts, one produced by the principal magnetic flux, $L_{m2}$, and the other produced by the rotor leakage flux, $L_{s2}$, that is $$L_2 = L_{m2} + L_{s2}. \qquad (17)$$

In according to the theory of inductance, we have
$$M^2 = L_{m1} L_{m2}. \qquad (18)$$

Representing each inductance with its corresponding reactance, we write $$\begin{aligned} \omega_1 L_1 &= X_{10}, & \omega_1 L_{m1} &= X_{m1}, & \omega_1 L_{s1} &= X_1, \\ \omega_2 L_2 &= X_{20}, & \omega_1 L_{m2} &= X_{m2}, & \omega_1 L_{s2} &= X_2 \\ \omega_1 M &= X_m, & X_{10} &= X_1 + X_{m1}, & X_{20} &= X_2 + X_{m2} \end{aligned} \qquad (19)$$

Substituting the values of reactances of (19) into the equations (14) and (15), and multiplying both sides of equation (15) by $\delta$, we get $$-\dot{U}_1 = (R_1 + jX_{10})\dot{I}_1 - jX_m \dot{I}_2' \angle \delta, \qquad (20)$$

$$-\dot{U}_2' \angle \delta = jX_m \dot{I}_1 + (R_2 - jX_{20})\dot{I}_2' \angle \delta, \qquad (21)$$

Since the stator and the rotor windings are connected in parallel, then
$$\dot{U}_2 = \dot{U}_2' = \dot{U}_1 = U, \qquad (22)$$
where the above equations (20) to (22) are the basic equations of the two-sides induction generator with both stator and rotor windings connected in parallel.

Resolving equations (20), (21) and (22) simultaneously, we get $$\dot{I}_1 = U(-C_1 + jD_1)/(A^2 + B^2) + [UX_m/(A^2+B^2)^{\frac{1}{2}}]\angle(-\theta + \delta), \qquad (23)$$

$$\dot{I}_2' = -U(C_2 + jD_2)/(A^2 + B^2) - [UX_m/(A^2+B^2)^{1/2}]\angle(-\theta - \delta), \qquad (24)$$

where $$\begin{aligned} A &= X_{10}X_{20} - X_m^2 + R_1 R_2, \\ B &= R_1 X_{20} - R_2 X_{10}, \\ C_1 &= R_2 A + X_{20} B = R_1(R_2^2 + X_{20}^2) - R_2 X_m^2, \\ D_1 &= X_{20} A - R_2 B = X_{10}(R_2^2 + X_{20}^2) - X_{20} X_m^2, \end{aligned} \qquad (25)$$

$$\begin{aligned} C_2 &= R_1 A - X_{10} B = R_2(R_1^2 + X_{10}^2) - R_1 X_m^2, \\ D_2 &= X_{10} A + R_1 B = X_{20}(R_1^2 + X_{10}^2) - X_{10} X_m^2, \\ \theta &= \tan^{-1}(A/B). \end{aligned} \qquad (26)$$

In my induction generator, since the slip $s = -1$, the equivalent rotor reactance has an opposite sign to the true reactance, so that the complex expressions of the conversion value and the true value of the rotor current are conjugate to each other, that is, $\dot{I}_2 = \dot{I}'_2{}^*$, or the true rotor current is $$\dot{I}_2 = U(-C_2 + jD_2)/(A^2 + B^2) - [UX_m/(A^2+B^2)^{\frac{1}{2}}](\theta + \delta), \qquad (27)$$

and from the expressions (23) and (27), the total current of the generator is $$\begin{aligned} \dot{I} &= \dot{I}_1 + \dot{I}_2 \\ &= U[-(C_1 + C_2) + j(D_1 + D_2)]/(A^2 + B^2) + \\ & \quad [2UX_m A/(A^2 + B^2)]\left(\delta - \frac{\pi}{2}\right) \end{aligned} \qquad (28)$$

From expressions (23), (24), (27) and (28), we know that when the angle $\delta$ changes, each phasor top of the currents draws a locus of a circle.

Expressing the above vector currents with pure complex quantities, we have $$\dot{I}_1 = U(F_1 + jH_1)/(A^2 + B^2) = [U_1(F_1^2 + H_1^2)^{\frac{1}{2}}/(A^2+B^2)]\angle \phi_1, \qquad (29)$$

$$\dot{I}_2' = U(F_2 - jH_2)/(A^2 + B^2) = [U(F_2^2 + H_2^2)^{\frac{1}{2}}/(A^2+B^2)]\angle(-\phi_2) \qquad (30)$$

$$\dot{I}_2 = U(F_2 + jH_2)/(A^2 + B^2) = [U(F_2^2 + H_2^2)^{\frac{1}{2}}/(A^2+B^2)]\angle \phi_2 \qquad (31)$$

$$\dot{I} = U(G + jK)/(A^2 + B^2) = [U(G^2 + K^2)^{\frac{1}{2}}/(A^2+B^2)]\angle \phi, \qquad (32)$$

where $$\begin{aligned} F_1 &= X_m(A\sin\delta + B\cos\delta) - C_1, \\ H_1 &= D_1 - X_m(A\cos\delta - B\sin\delta), \\ F_2 &= X_m(A\sin\delta - B\cos\delta) - C_2, \\ H_2 &= D_2 - X_m(A\cos\delta + B\sin\delta), \\ G &= 2X_m A\sin\delta - (C_1 + C_2), \\ K &= (D_1 + D_2) - 2X_m A\cos\delta. \end{aligned} \qquad (33)$$

$$\phi_1 = \tan^{-1}(H_1/F_1), \qquad (34)$$

$$\phi_2 = \tan^{-1}(H_2/F_2), \qquad (35)$$

$$\phi = \tan^{-1}(K/G). \qquad (36)$$

The power factor of the generator
$$\cos\phi = G/(G^2 + K^2)^{\frac{1}{2}} \qquad (37)$$

In equations (20) and (21), substituting $X_1 + X_{m1}$ and $X_2 + X_{m2}$ for $X_{10}$ and $X_{20}$ respectively, we have $$-\dot{U}_1 = [R_1 + j(X_1 + X_{m1})]\dot{I}_1 - jX_m \dot{I}_2'\angle \delta, \qquad (38)$$

$$-\dot{U}_2' \angle \delta = jX_m \dot{I}_1 + [R_2 - j(X_2 + X_{m2})]\dot{I}_2'\angle \delta, \qquad (39)$$

Let $$\dot{E}_1 = -j(X_{m1}\dot{I}_1 - X_m \dot{I}_2'/\delta, \qquad (40)$$

$$\dot{E}_2' = -j[(X_m \dot{I}_1 \angle -\delta) - X_{m2}\dot{I}_2'], \qquad (41)$$

$$\dot{E}_2 = \dot{E}_2'{}^* = -j(X_{m2}\dot{I}_2 - X_m \dot{I}_1{}^*\angle \delta), \qquad (42)$$

(the star sign * represents the conjugate complex quantities).

Then, from equations (38) and (39) we get $$\dot{U}_1 = \dot{E}_1 - Z_1 \dot{I}_1, \quad Z_1 = R_1 + jX_1, \tag{43}$$

$$\dot{U}_2' = \dot{E}_2' - Z_2 \cdot \dot{I}_2' Z_2^* = R_2 - jX_2. \tag{44}$$

In my induction generator, for $s = -1$, we have $\dot{U}_2 = \dot{U}_2'^*$, then $$\dot{U}_2 = \dot{E}_2 - Z_2 \dot{I}_2, \quad Z_2 = R_2 + jX_2. \tag{45}$$

From equations (43) to (45), we know $E_1$ and $E_2$ are the stator and the rotor induced EMF respectively, and $E_2'$ is the conversion value of the rotor induced EMF. Substituting the values of $I_1$, $I_2'$ and $I_2$ from equations (23), (24) and (27) into equations (43), (44) and (45) rearranging and noticing the relations $U_2' = U_2 = U_1 = U$, $X_m^2 = X_{m1} X_{m2}$, we get $$\dot{E}_1 = [UX_m z_2] \angle \beta_2]/(A^2+B^2)^{\frac{1}{2}} + [UX_m z_1/(A^2+B^2)^{\frac{1}{2}}](-\beta_1+\delta), \tag{46}$$

$$\dot{E}_2' = [UX_{m2} z_1 \angle -\beta_1]/(A^2+B^2)^{\frac{1}{2}} + [UX_m z_2/(A^2+B^2)^{\frac{1}{2}}](\beta_2-\delta), \tag{47}$$

$$\dot{E}_2 = [UX_{m2} z_1 \angle \beta_1]/(A^2+B^2)^{\frac{1}{2}} + [UX_m z_2/(A^2+B^2)^{\frac{1}{2}}](\beta_2+\delta), \tag{48}$$

where $$z_1 = (R_1^2 + X_1^2)^{\frac{1}{2}}, \quad z_2 = (R_2^2 + X_2^2)^{\frac{1}{2}}; \tag{49}$$

$$\beta_1 = \tan^{-1}[(R_1 A - X_1 B)/(X_1 A + R_1 B)], \beta_2 = \tan^{-1}[(R_2 A + X_2 B)/(X_2 A - R_2 B)] \tag{50}$$

From expressions (46) to (48), we know that the phasors $\dot{E}_1$, $\dot{E}_2'$ and $\dot{E}_2$ changes with $\delta$, and each has a locus of a circle. The first term of each expression is the center of the circle.

From the above expressions of currents and MMF, we know that in ideal case, when the parameters of both sides of the stator and the rotor are equal, then $\dot{I}_1 = \dot{I}_2$, $\dot{E}_1 = \dot{E}_2$.

From the expression (29), we know the power phasor of the stator output to be $$\dot{W}_1 = 3 U \dot{I}_1^* = P_1 + jQ_1 = 3U^2(F_1 - jH_1)/(A^2+B^2) \tag{51}$$

So the active output power of the stator is $$P_1 = 3U^2 F_1/(A^2 + B^2) \tag{52}$$
$$= 3U^2 [X_m(A\sin\delta + B\cos\delta) - C_1]/(A^2+B^2)$$
$$= 3U^2 X_m \cos(\theta_2 - \delta)/(A^2+B^2)^{\frac{1}{2}} - 3U^2 C_1/(A^2+B^2)$$

and the reactive power is $$Q_1 = -3U^2 H_1/(A^2 + B^2) \tag{53}$$
$$= -3U^2[D_1 - X_m(A\cos\delta - B\sin\delta)]/(A^2+B^2)$$
$$= 3U^2 X_m \sin(\theta - \delta)/(A^2+B^2)^{\frac{1}{2}} - 3U^2 D_1/(A^2+B^2)$$

From the expression (31), we know that the power phasor of the rotor output is
$$\dot{W}_2 = 3U\dot{I}_2^* = P_2 + jQ_2 = 3U^2(F_2 - jH_2)/(A^2+B^2) \tag{54}$$
so that the active output power and reactive power of the rotor are $$P_2 = 3U^2 F_2/(A^2+B^2) \tag{55}$$
$$= 3U^2[X_m(A\sin\delta - B\cos\delta) - C_2]/(A^2+B^2)$$
$$= -3U^2 X_m \cos(\theta + \delta)/(A^2+B^2)^{\frac{1}{2}} - 3U^2 C_2/(A^2+B^2)$$

and $$Q_2 = -3U^2 H_2/(A^2+B^2) \tag{56}$$
$$= -3U^2[D_2 - X_m(A\cos\delta + B\sin\delta)]/(A^2+B^2)$$
$$= 3U^2 X_m \sin(\theta + \delta)/(A^2+B^2)^{\frac{1}{2}} - 3U^2 D_2/(A^2+B^2)$$

respectively The total output power of the generator is $$P = P_1 + P_2 = 3U^2[2X_m a\sin\delta - (C_1+C_2)]/(A^2+B^2), \tag{57}$$

and the total reactive power is $$Q = Q_1 + Q_2 = -3U^2[(D_1+D_2) - 2X_m A\cos\delta]/(A^2+B^2). \tag{58}$$

Moreover, the copper loss of the stator is
$$P_{cu1} = 3I_1^2 R_1 = 3U^2 R_1(F_1^2 + H_1^2)/(A^2+B^2)^2.$$

Substituting the values of $F_1$ and $H_1$ into the above equation, we get
$$P_{cu1} = 3U^2 R_1[X_m^2 + R_2^2 - 2X_m(R_2\sin\delta + X_{20}\cos\delta)]/(A^2+B^2). \tag{59}$$

From this, the electromagnetic power of the stator is calculated as, $$P_{M1} = P_1 + P_{cu1} \tag{60}$$
$$= 3U^2 X_m[(R_1+R_2)X_m - c\cos(\theta'+\delta)]/(A^2+B^2),$$

where $$c = (a^2+b^2)^{\frac{1}{2}}, \quad \theta' = \tan^{-1}(a/b), \tag{61}$$
$$a = X_{10} X_{20} - X_m^2 - R_1 R_2, \quad b = R_1 X_{20} + R_2 X_{10}.$$

The copper loss of the rotor, is $$P_{cu2} = 3I_2^2 R_2 \tag{62}$$
$$= 3U^2 R_2(F_2^2 + H_2^2)/(A^2+B^2)^2$$
$$= 3U^2 R_2[X_m^2 + R_1^2 + X_{10}^2 - 2X_m(R_1\sin\delta + X_{10}\cos\delta)]/(A^2+B^2).$$

From the expressions (55) and (62), we get the electromagnetic power of the rotor, $$P_{M2} = P_2 + P_{cu2} = P_{M1} \tag{63}$$

This is an interesting and significant result, that is, although the parameters of the stator and the rotor are usually different, the electromagnetic powers of the two sides are always strictly equal, so that the generator may get nearly maximum power output in its rated work. The total electromagnetic power of the generator $$P_M = 2P_{M1} = 2P_{M2} \qquad (64)$$
$$= 6U^2 X_m[(R_1 + R_2)X_m - c\cos(\theta' + \delta)]/(A^2 + B^2)$$
$$= 6U^2 X_m\left[(R_1 + R_2)X_m + c\sin\left(\delta - \left(\frac{\pi}{2} - \theta'\right)\right)\right]/(A^2 + B^2)$$

Therefore $\delta$ corresponds to the power angle of a synchronous generator, and the equation (64) denotes the power angle characteristic. When $\theta' + \delta = \pi$, the maximum electromagnetic power is obtained, i.e., $$P_{Mm} = 6U^2 X_m[(R_1+R_2)X_m+c]/(A^2+B^2), \qquad (65)$$

and the overload ability $$k_m = [(R_1+R_2)X_m+c]/[(R_1+R_2)X_m-c\cos(\theta'+\delta)]. \qquad (66)$$

Both sides of the two-sided induction generator have some similar properties of a synchronous generator, so that the iron loss of two-sided induction generator may also be considered as the power loss which shows a mechanical resistance. Hence, the electromagnetic power $P_M$ is equal to the mechanical imput $P_{1g}$ of the rotor minus the mechanical loss $p_{mc}$ (which consist of the friction loss and the windage loss), the stray loss $P_s$ and the iron loss $p_c$. One part of $P_M$ put into the stator to be the stator electromagnetic power $P_{M1}$ and the other part put into the rotor to be the rotor electromagnetic power $P_{M2}$. Subtracting the copper losses $p_{cu1}$ and $P_{cu2}$ from the electromagnetic powers we get the stator output $P_1$ and the rotor output $P_2$ respectively expressed by equations:

$$P_{1g} - (p_{mc} + p_s) - p_c = P_M, \qquad (67)$$
$$P_M = P_{M1} + P_{M2} = 2P_{M1} = 2P_{M2},$$
$$P_{M1} - p_{cu1} = P_1, P_{M2} - p_{cu2} = P_2, P = P_1 + P_2.$$

Figure 5:
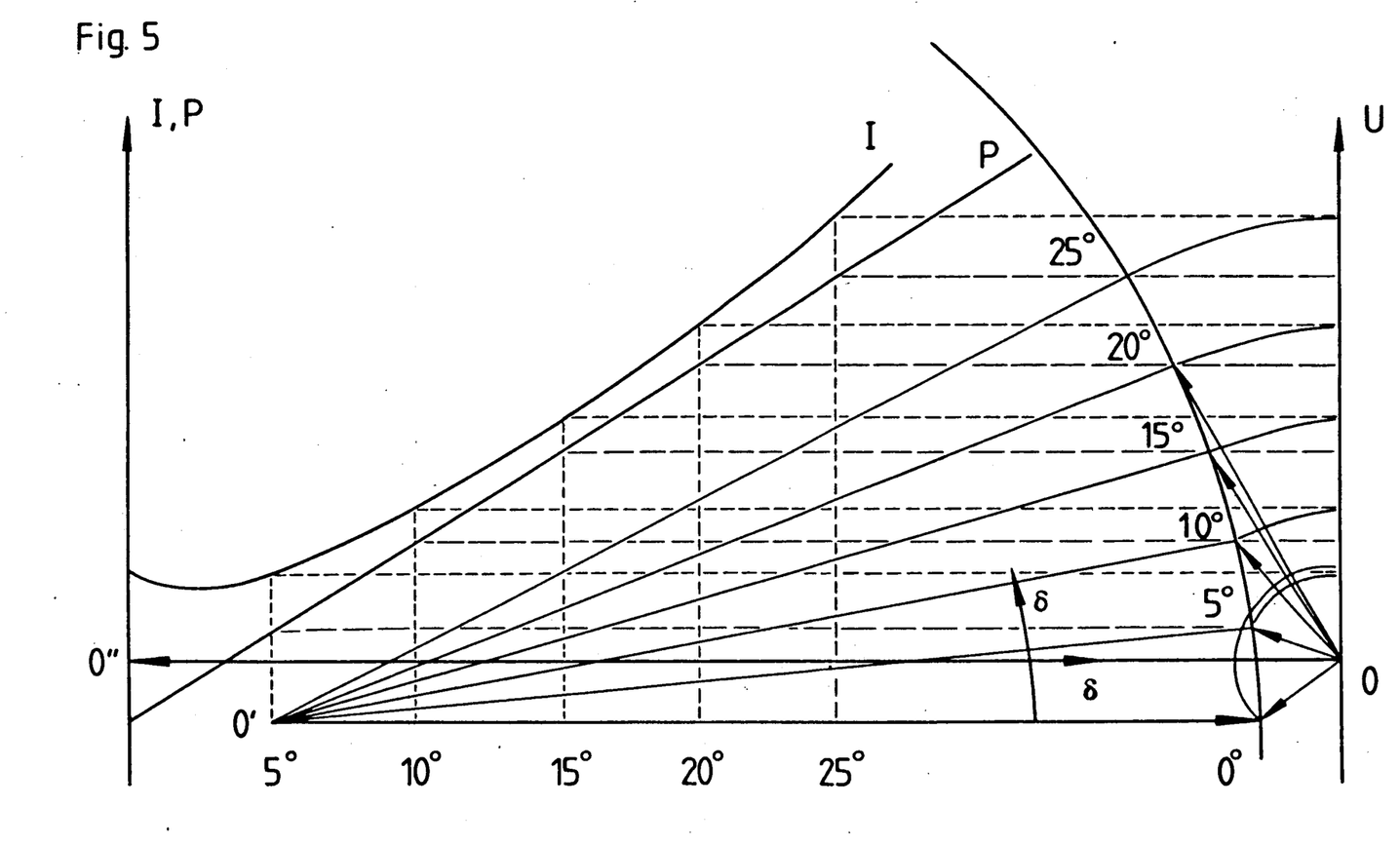
FIG. 5 is a graphical representation of current I and output power P against power angle $\delta$.

The characteristic curves of the currents against the power angle $\delta$ may either be calculated by the equations (29) to (32) or drawn by the graphical method with the circles of the current loci from equations (23) to (28). FIG. 5 is the curve of current against $\delta$ drawn by graphical method. The current circle is drawn on a complex coordinates from equation (28), with the first term $U[-(C_1+C_2)+j(D_1+D_2)]/(A^2+B^2)$ to be the center of the circle and the amplitude of the second term $2UX_mA/(A^2+B^2)$ to be the radius. Then the complex plane is rotated 90° anticlockwise. OU is the real axis and OU is the imaginary axis (j) and o is the center of the circle locus of phasor I. Again, the horizontal coordinates directed to the right denote the values of $\delta$ and the vertical coordinates denote the absolute values of the current I.

The curves of the active and reactive powers against $\delta$ may be calculated from the mathematical expressions given above, but they may also be drawn by the graphical method. In FIG. 5, the vertical real axis express the active power, and the negative imaginary axis ($-j$) express the reactive power. The current vectors are considered to be the power vectors as the scale is changed. Then the projections of the power vectors on the real axis are the active powers and those on the j-axis are the reactive powers of negative value. Only the curve of the resultant power P was constructed in FIG. 5.

The required parallel capacitances of the two-sided induction generator are different with different loads. When P=0, then $\delta$ is small and $\cos\delta \approx 1$. From expression (58) we have the reactive power of zero load $$|Q| = 3U^2(D_1+D_2-2X_mA)/(A^2+B^2).$$

Let the effective value of the capacitive current in this case be $I_{co}$, and the corresponding capacitance per phase in Y connection be $C_o$, then $$|Q| = 3UI_{co} = 3U \cdot_1 C_0 U = 3_1 C_0 U^2 = 6\pi f C_0 U^2.$$

In comparing the above two equations we have $$C_0 = (D_1+D_2-2X_mA)/2\pi f(A^2+B^2) = (D_1+D_2-2X_mA \times 10^6)/2\pi f(A^2+B^2)\mu F. \qquad (68)$$

When the generator is in load condition, the capacitance per phase in Y connection is known from equation (58) to be $$c = [(D_1D_2-2X_mA\cos\delta)/(2\pi f(A^2+B^2))] \times 10^6(\mu F) \qquad (69)$$

If the current I and the output P of the generator are known, the power angle $\delta$ may be found from the curves of FIG. 5 and then the value of capacitance C may be calculated by substituting the value of power angle into equation (69).

It must be pointed out that $C_0$ and C are the values of capacitance per phase in Y connection. If it is changed into equivalent delta connection, the required capacitance per phase is ⅓ of that in Y connection, so that the values of $C_0$ and C in expressions (68) and (69) also represent the total capacitances of the delta connection.

Figure 6:
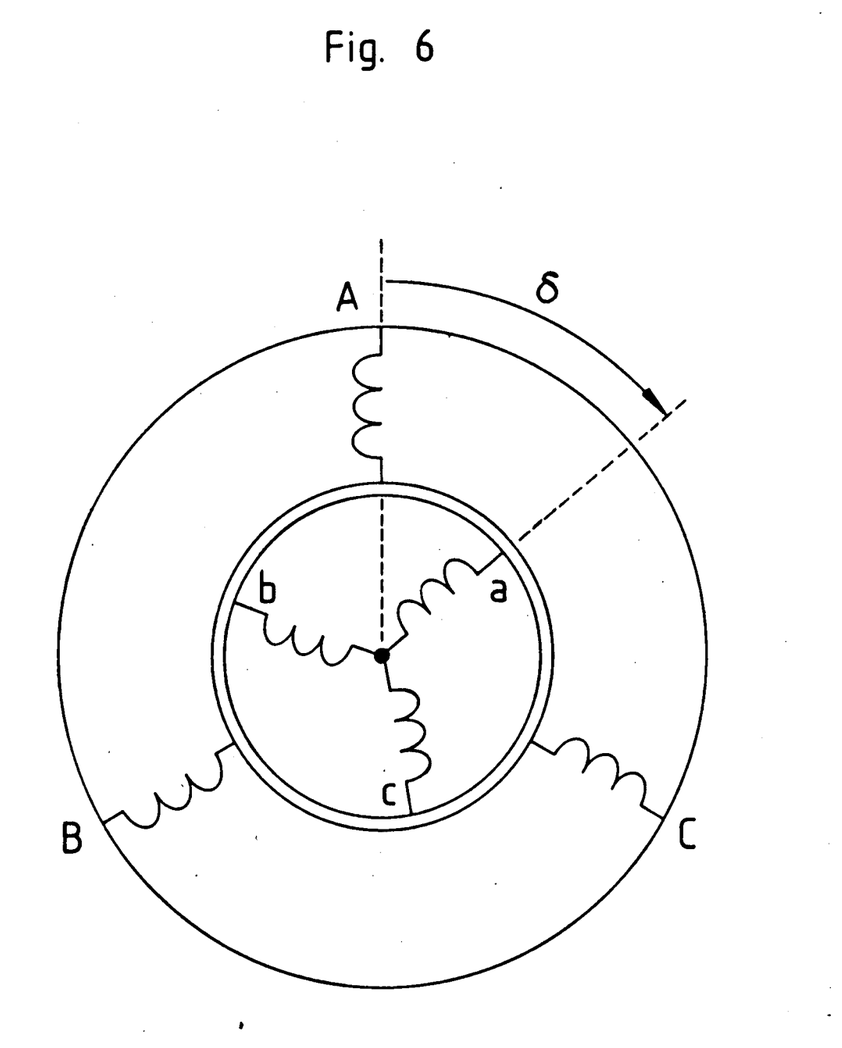

The method used to analyze the performance of the two-sided induction generator as shown in FIG. 1 may be adopted to find the rated power ratio of the generator and the motor running with the same machine. The output power of the motor is first calculated as in FIG. 6. Let the voltage and the current of the stator be $$u_1 = U_{m1}\sin\omega_1 t, \qquad (70)$$
$$i_1 = I_{m1}\sin(\omega_1 t - \phi_1); \qquad (71)$$

and those of the rotor be $$u_2 = 0 \qquad (72)$$
$$i_2 = I_{m2}\sin(w_2 t - \phi_2), \qquad (73)$$

where $\phi_1$ and $\phi_2$ are constants. At the time of $t=0$, the axis of the rotor winding lags that of the stator winding according to the rotating direction by an angle $\delta_0$. For the rotating speed rads/sec, the lagging angle at any time t is $\delta_t = \delta_0 - t$. Then the equivalent mutual linkage of stator winding produced by the rotor current is $$\psi_{12} = MI_{m2}\sin(\omega_2 t - \phi_2 - \delta_t) \qquad (74)$$
$$= MI_{m2}\sin(\omega_2 t - \phi_2 - \delta_0 + wt)$$
$$= MI_{m2}\sin(\omega_1 t - \phi_2 - \delta_0),$$

where the angular frequency of rotor current is $\omega_2 = \omega_1 - \omega > 0$. The equivalent mutual linkage of rotor winding produced by the stator current is $$\psi_{21} = MI_{m1}\sin(\omega_1 t - \phi_1 + \delta_t) \quad (75)$$
$$= MI_{m1}\sin(\omega_1 t - \phi_1 + \delta_0 - wt)$$
$$= MI_{m1}\sin(\omega_2 t - \phi_1 + \delta_0).$$

From these the voltage balance equations may be obtained as $$u_1 = \frac{d\psi_{12}}{dt} + R_1 i_1 + \frac{d}{dt}(L_1 i_1) \quad (76)$$

$$0 = \frac{d\psi_{21}}{dt} + R_2 i_2 + \frac{d}{dt}(L_2 i_2) \quad (77)$$

Substituting the currents and the magnetic flux linkages of the stator and the rotor into the above two equations, we have $$U_{m1}\sin\omega_1 t = {}_1 M I_{m2}\sin\left(\omega_1 t - \phi_2 - \delta\theta + \frac{\pi}{2}\right) +$$

$$RI_{1m1}\sin(\omega_1 t - \phi_1) + \omega_1 L_1 I_{m1}\sin\left(\omega_1 t - \phi_1 + \frac{\pi}{2}\right),$$

$$0 = \omega_2 M I_{m1}\sin\left(\omega_2 t - \phi_1 + \delta_0 + \frac{\pi}{2}\right) +$$

$$R_2 I_{m2}\sin(\omega_2 t - \phi_2) + \omega_2 L_2 I_{m2}\sin\left(\omega_2 t - \phi_2 + \frac{\pi}{2}\right).$$

Representing the quantities in the above equations with respective phasors, we get $$\dot{U}_1 = (R_1 + j\omega_1 L_1)\dot{I}_1 + j_1 M I_2 \angle -\delta_0, \quad (78)$$

$$O = j\omega_2 M \dot{I}_1 + (R_2 + j\omega_2 L_2)\dot{I}_2 - \delta_0 \quad (79)$$

The slip of the induction machine $s=(\omega_1-\omega)/\omega_1=\omega_2/\omega_1$, so that $\omega_2=s\omega_1$. Substituting the value of $\omega_2$ into equation (79), and dividing the two sides by $S\angle\delta_0$, equations (78) and (79) are changed to be $$\dot{U}_1 = (R_1 + j\omega_1 L_1)\dot{I}_1 + j\omega_1 M I_2 \angle -\delta_0 \quad (80)$$

$$O_{32} j\omega_1 M \dot{I}_1 + (R_2/s + j\omega_1 L_2)\dot{I}_2 \angle -\delta_0 \quad (81)$$

The rotor windings may be substituted by the equivalent stationary ones with their currents and voltages of synchronous angular frequency $\omega_1$, so that equations (80) and (81) can be solved simultaneously. Now we express every inductance in the above equations with its corresponding reactance as in equation (19), and put $U_1=U_1$, then $$U_1 = (R_1 + jX_{10})\dot{I}_1 + jX_m \dot{I}_2 \angle -\delta_0, \quad (82)$$

$$O = jX_m \dot{I}_1 + (R_2/s + jX_{20})\dot{I}_2 \angle -\delta_0 \quad (83)$$

Solving the above equations simultaneously, we get $$I_1 = U_1[(X_{20}B' - R_2A'/s) - j(X_{20}A' + R_2B'/s)]/(A'^2+B'^2), \quad (84)$$

where $$A' = X_{10}X_{20} - X_m^2 - R_1R_2/s, \quad B' = R_2X_{20}/s + R_1X_{20}. \quad (85)$$

The input power of the motor $$P_{in} = Re[3U_1\dot{I}_1^*] = 3U_1^2(X_{20}B' - R_2A'/s)/(A'^2+B'^2). \quad (86)$$

Let $\eta$ be the efficiency of the motor, then the output power $$p_{out}\eta p_{in} = 3U_1^2(X_{20}B' - R_2A'/s)\eta/(A'^2+B'^2). \quad (87)$$

so the power ratio of the generator and the motor is the ratio of their output powers. From equations (57) and (87), we get $$K_p = (U/U_1)^2[(A'^2+B'^2)/(A^2+B^2)]\cdot(2X_m\sin\delta - (C_1+C_2))/(X_{20}B' - R_2A'/s)\eta \quad (88)$$

This is the detailed formula of the output power ratio of the two-sided induction generator and the induction motor running with the same machine. It is related to the parameters of the machine, the power angle of the generator, the slip of the motor, and the rated voltages of the generator and the motor, but in any case, the value of $K_p$ calculated from the formula (88) is about 4. This is because that when we count the physical quantities roughly so that the losses of the machine are neglected, the electromagnetic torque of the two-sided inducting generator may be about twice of that of the single-sided induction generator and the speed of the two-sided induction generator is also twice of the speed of the single-sided induction generator, hence the power of the two-sided induction generator should be about 4 times of the single-sided induction generator or the induction motor.

The true overload ability of the two-sided induction generator is much larger than a synchronous generator of the same size. In laboratory it has been seen to work safely with more than twice of its rated power load, i.e., with a load of 8 or 9 times of the rated power of its corresponding induction motor. The temperature rise is not large because of good ventilating conditions due to the high speed rotor rotation at twice the synchronous speed.

The defect of this generator is that it cannot work in parallel connection with any other AC power source, because there is no synchronous torque between the rotating magnetic field and the true magnetic poles of the rotor, however, it provides an excellent energy source for remote areas.

While I have shown my invention in various forms, it will be obvious to those skilled in the art that it is not so limited but is susceptible of various changes and modifications without departing from the spirit thereof.

What is claimed is:

1. Apparatus for generation of electrical energy comprising a fixed stator having three-phase windings, A, B, and C, a driven rotor having three-phase windings, a, b, and c; each phase winding of said rotor and stator having an output connection; said rotor windings being an inverse of said stator windings such that the angular measure between winding A and winding B is $\pi/3$ radians, between winding A and winding C is $\pi/3$ radians, between winding a and winding b is $\pi/3$ radians, between winding a and winding c is $\pi/3$ radians, and wherein said rotor is driven counterclockwise, said apparatus has three-phase outputs including a first phase output connected to winding A and a, a second phase output connected to winding B and c, and a third phase output connected to C and b; with each phase output being connected to each other phase output by a variable capacities therebetween, the capacitances thereof determined from the equations:

$$C_o = \frac{D_1 + D_2 - 2X_mA}{2\pi f(A^2 + B^2)} \times 10^6 \; \mu f, \text{ and}$$

$$C = \frac{(D_1 + D_2 - 2X\cos\delta)}{2\pi f(A^2 + B^2)} \times 10^6 \; \mu f, \text{ where}$$

$A = X_{10}X_{20} - X_m^2 + R_1R_2$
$B = R_1X_{20} - R_2X_{10}$
$D_1 = X_{20}A - R_2B = X_{10}(R_2^2 + X_{20}^2) - X_{20}X_m^2$
$D_2 = X_{10}A - R_1B = X_{20}(R_1^2 + X_{10}^2) - X_{10}X_m^2$
$R_1$ = stator resistance
$R_2$ = rotor resistance
$X_1$ = stator leakage resistance
$X_{m1}$ = stator main magnetic circuit reactance
$X_2$ = rotor leakage reactance
$X_{m2}$ = rotor main magnetic circuit reactance
$\delta$ = power angle.

2. Apparatus for generating electrical energy comprising:
(a) a stator having a plurality of first, second, and third phase windings mounted thereon; and
(b) a driven rotor having an equal number first, second, and third phase windings thereon, with the space phase sequence of the rotor winding being opposite the stator windings, with the effective number of turns on the rotor winding adapted to make the voltage ratio, $k_e$ and the current ratio $k_i$ equal to 1, and with both sets of phase windings having substantially equal current carrying capacity; wherein said rotor and stator winding each have output connection with each rotor phase winding being connected to a stator phase winding having an opposite voltage phase to provide a phase output line, with said phase output lines connected to a variable delta connected three-phase condensor set.

3. A self-exciting three-phase electric generator comprising:
(a) a y-connected three-phase stator having a common end of a first, second, and third phase winding thereof connected to ground and the other end of each phase winding connected to a load;
(b) a y-connected three-phase rotor mounted in said stator for rotation in the same direction as a moving magnetic force generated by the excitation of said stator at a speed equal to twice the angular speed of said moving magnetic force, with a common end of a primary, secondary, and tertiary phase winding thereof connected to ground wherein said rotor phase windings are physically inversely related to said stator phase windings such that at a time t=0, the axis of the second phase winding of the rotor leads the axis of the secondary phase winding of the stator by an angle equal to $\delta + \pi$ where $\delta$ is a time phase angle; output connection from said stator and rotor phase windings such that said first phase winding is connected in parallel with said tertiary phase winding to form a first phase output;
(c) said second phase winding is connected in parallel with said secondary phase winding to form a second phase output and said third phase winding is connected in parallel with said primary phase winding to form a third phase output; and
(d) a variable capacitive parallel connection connected to the output connection of each parallel output of said stator and rotor with a first variable capacitor connected between said first phase output and said second phase output; a second variable capacitor connected between said second phase output and said third phase output, and a third variable capacitor connected between said third phase output and said first phase output, said first, second, and third capactor being ganged for simultaneous selective variations.

* * * * *